April 24, 1956     H. KYLIN ET AL     2,742,810
DISPLAY ELEMENT
Filed Oct. 26, 1955
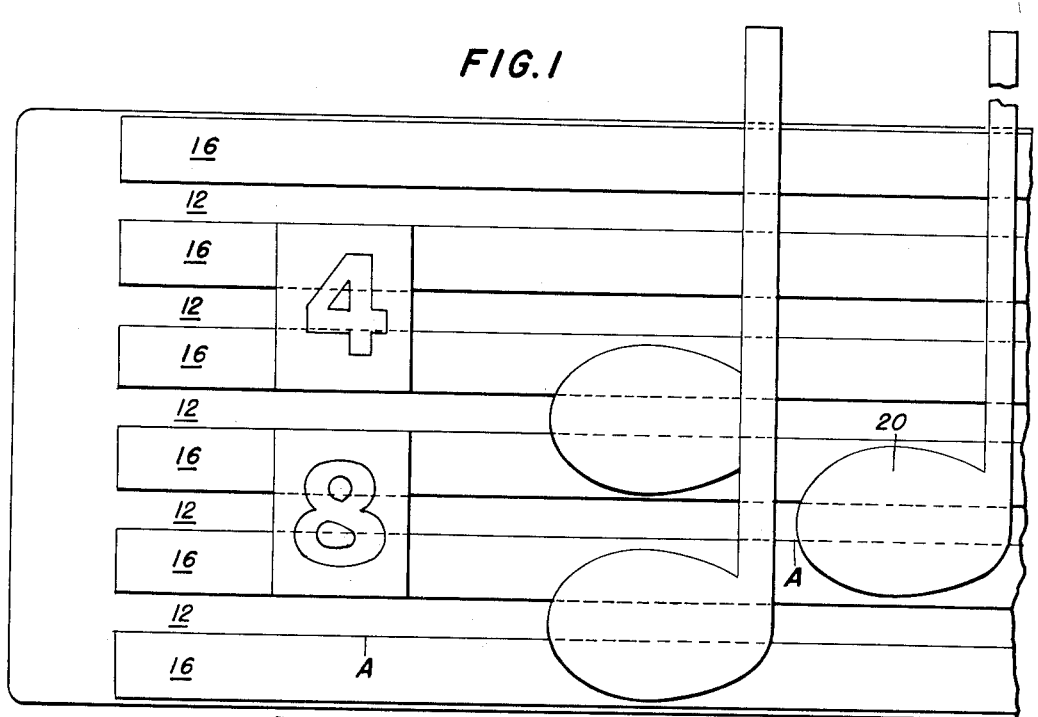
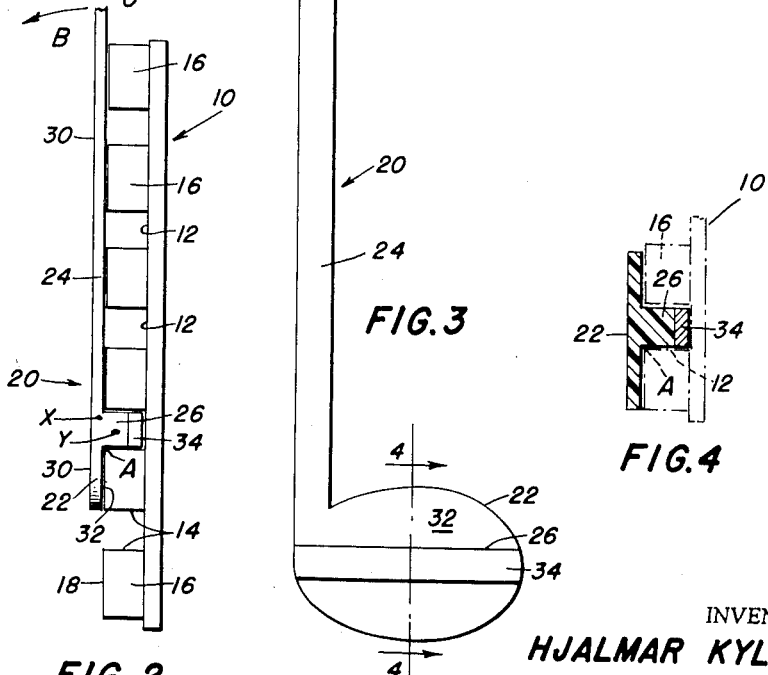
INVENTORS
HJALMAR KYLIN
ANNE KYLIN
BY Leech & Radue
ATTORNEYS United States Patent Office 2,742,810
Patented Apr. 24, 1956

2,742,810

DISPLAY ELEMENT

Hjalmar Kylin and Anne Kylin, Alexandria, Va.

Application October 26, 1955, Serial No. 542,910

3 Claims. (Cl. 84—471)

This invention relates to display elements and more particularly to display elements adapted for use on music or sign boards having grooves and connecting portions used to simulate the lines and spaces making up the staff. The board grooves are adapted to receive and carry a projection extending from each display element.

Apparatus of the above description is particularly useful in teaching music wherein the students place the music symbols on the board in accordance with the work being studied. Many types of display or symbol elements have been designed for use with such music boards, some of them rely on friction to retain the element on the board, some use clips and others employ magnetic means. None of these means have proved to be entirely satisfactory.

In view of the foregoing one of the objects of this invention is to provide a display element for music boards of the type described above which will easily fit and readily remain in position on the board.

It is another object to provide a display element having a projection adapted to fit into the grooves of the music board wherein the center of gravity of the display element is located in the projection.

These and other objects will become more apparent from the following detailed description when taken in conjunction with the drawing, showing by way of example, a preferred embodiment of this invention, and wherein:

Fig. 1 is a front elevation showing the grooved music board with some of the music symbols mounted thereon;

Fig. 2 is an end elevation showing the manner in which the projection of a symbol fits into a board groove;

Fig. 3 is a rear elevation of one type of music symbol showing the projection which fits into a board groove; and Fig. 4 is a vertical cross-sectional view taken along line 4—4 of Fig. 3 showing the construction of the symbol's projection and the manner in which it fits into the board groove shown in dotted lines.

In using music boards of the type under consideration for teaching it is particularly advantageous to be able to mount the board on the wall of a room where the board will be positioned vertically and generally perpendicular to the floor. In general, music symbols which are used with these boards must have some means associated with them for holding them on the board. These may take the form of clips, magnets, friction elements or other suitable means. This invention has developed a simple and yet effective means for accomplishing the same results.

As shown in Figs. 1 and 2, the music board 10 has a plurality of horizontal grooves 12 formed by parallel side walls 14 on portions 16 whose front faces form a plane surface 18 generally perpendicular to side walls 14.

All of the music symbols shown in Fig. 1 are mounted on the board by the same means. Consequently only symbol 20 will be described in detail. The symbol element 20 comprises a body 20 having a stem portion 24 extending upwardly therefrom and a projection 26 extending outwardly from the rear of the body. As shown in Fig. 2 the body 22 and stem 24 are of the same thickness and have parallel front and rear faces 30 and 32. The projection 26 is generally rectangular in shape and is perpendicular to the rear face of the body 22. It should be noted that the projection extends transversely of the body 22 and perpendicular to the stem 24 so that the symbol will be correctly positioned with the stem 24 upright on the music board 10.

As shown in Figs. 2 and 4, the projection 26 is freely received in groove 12. This projection has an end portion 34 composed of heavier material than the remainder of the element 20. This end portion is of sufficient size so that the center of gravity of the entire element 20 will be located somewhere between the end portion and the rear face of the body.

With the board in a perfectly vertical position without the added weight of end portion 34, the weight and position of the body 22 and stem 24 is such that the center of gravity of the element 20 is somewhere outward of the plane 18, for example at $x$. With the center of gravity in such a position there is a tendency for the element to pivot about a line A formed by the intersection of the lower side wall 14 with plane 18 formed by portions 16. This causes the stem to pivot counterclockwise away from the board, as indicated by the arrow B. This is very undesirable since the elements continually tend to slide out of the grooves under this pivoting action and may fall off the board if it is jiggled when applying another symbol. However, by moving the center of gravity to a point inward of the rear face 32, for example at $Y$ in projection 26, so that the center of gravity will be inward of line A there will be a tendency of the element to pivot clockwise about line A toward the board, as indicated by arrow C. Thus by keeping the center of gravity inward of line A there is no tendency for the element to pivot outwardly away from the board.

What I claim as novel and desire to secure by Letters Patent of the United States is:

1. A display element adapted to be carried on a vertically mounted board having horizontal grooves formed with parallel side walls, the outer surface of the portions between the grooves being perpendicular to these side walls, said display element comprising a body having front and rear faces, a projection extending outwardly from the rear face of the body and being adapted to freely fit in the board grooves, the end portion of the projection being composed of a material heavier than the material in the remainder of the projection and body of the display element, this end portion being of sufficient weight that the center of gravity of the display element will lie between the rear body face and the end portion of the projection so that when the display element is positioned on the board with the projection in one of the board grooves the center of gravity of the display element will be inward of the intersection of the lower side wall of the groove and the outer surface of the portion between grooves thereby causing the upper portion of the element to tend to pivot about this intersection toward the said surface and thus hold the element close against the display board.

2. A display element adapted to be carried on a vertically mounted board having horizontal grooves formed with parallel side walls, the outer surface of the portions between the grooves being perpendicular to these side walls, said display element comprising a body portion having generally parallel front and rear faces, the front face being adapted to carry the display, a projection extending perpendicularly outwardly from the rear face of the body, said projection being generally rectangular in shape and having a thickness slightly less than the width of the board grooves, said projection adapted to fit in the board grooves, the end portion of the projection being composed of a material heavier than the material in the remainder of the projection and body of the display element, this end portion being of sufficient weight that the center of gravity of the display element will lie between the rear body face and the end portion of the projection so that when the display element is positioned on the board with the projection in one of the board grooves the center of gravity of the display element will lie inwardly of the intersection of the lower side wall of the groove and the outer surface of the portion between grooves thereby causing the upper portion of the element to tend to pivot about this intersection toward the said surface and thus hold the element close against the display board.

3. In combination with a vertically mounted display board having horizontal grooves formed with parallel side walls and the outer surface of the portions between the grooves perpendicular to these side walls, a display element comprising a body having generally parallel front and rear faces, a projection extending perpendicularly outward from the rear face of the body, said projection being generally rectangular in shape and fitting into one of the display board grooves, the end portion of the projection being composed of a material heavier than the material in the remainder of the projection and body of the display element, this end portion being of sufficient weight that the center of gravity of the display element will fall between the rear body face and the end portion of the projection thereby causing the upper portion of the element to pivot toward the board about a line defined by the intersection of the lower side wall of the groove and the outer surface of the portion between the grooves and thus hold the element closely against the display board.

No references cited.